United States Patent [19]
Engle

[11] Patent Number: 5,620,072
[45] Date of Patent: Apr. 15, 1997

[54] TRANSFER CASE HAVING DISC PACK AND CONE CLUTCH

[75] Inventor: Jack F. Engle, Muncie, Ind.

[73] Assignee: Borg-Warner Automotive, Inc., Sterling Heights, Mich.

[21] Appl. No.: 383,802

[22] Filed: Feb. 3, 1995

[51] Int. Cl.$^6$ .................................................. B60K 23/08
[52] U.S. Cl. ......................... 192/35; 192/48.2; 192/93 A; 192/113.36; 192/54.52; 180/247
[58] Field of Search .......................... 192/48.2, 35, 93 A, 192/113.36, 48.4, 54.52, 48.3; 180/247; 74/669 F, 665 GE, 665 G

[56] References Cited

U.S. PATENT DOCUMENTS

| | | | |
|---|---|---|---|
| 2,059,935 | 11/1936 | Eason | 192/66 |
| 2,176,468 | 10/1939 | Morin et al. | 192/85 |
| 4,226,318 | 10/1980 | Morgan | 192/109 R X |
| 4,770,280 | 9/1988 | Frost | 192/53 |
| 5,038,628 | 8/1991 | Kayama | 192/113.36 X |
| 5,086,898 | 2/1992 | Patton et al. | 192/70.12 |
| 5,215,160 | 6/1993 | Williams et al. | 180/247 X |
| 5,271,489 | 12/1993 | Kameda et al. | 180/247 |
| 5,385,222 | 1/1995 | Otto et al. | 192/3.29 |
| 5,465,820 | 11/1995 | Dick | 192/35 |

FOREIGN PATENT DOCUMENTS

| | | | |
|---|---|---|---|
| 398445 | 7/1924 | Germany | 47/7 |
| 898532 | 11/1953 | Germany | 47/11 |

OTHER PUBLICATIONS

Basic Clutches and Transmissions No. 2, Petersen Publishing, Los Angeles, California, 1971.

*Primary Examiner*—Charles A. Marmor
*Assistant Examiner*—Saul Rodriguez
*Attorney, Agent, or Firm*—Brinks Hofer Gilson & Lione; Greg Dziegielewski

[57] ABSTRACT

A transfer case includes a clutch assembly having both a disc pack clutch and cone clutch disposed in mechanical parallel between the main transfer case shaft and secondary output shaft. The disc pack clutch includes a plurality of interleaved discs and an electromagnetic operator which effects compression of the clutch pack to transfer torque from the main transfer case shaft to a chain drive sprocket, through a chain, to the secondary output shaft. The cone clutch is disposed adjacent the disc pack and is also actuated by the electromagnetic operator. One of the cone clutch elements is driven by the main transfer case shaft and the other cone clutch element provides power to the drive chain and, in turn, to the secondary output shaft. Preferably, the other cone clutch element is integrally formed with the chain drive sprocket.

20 Claims, 3 Drawing Sheets

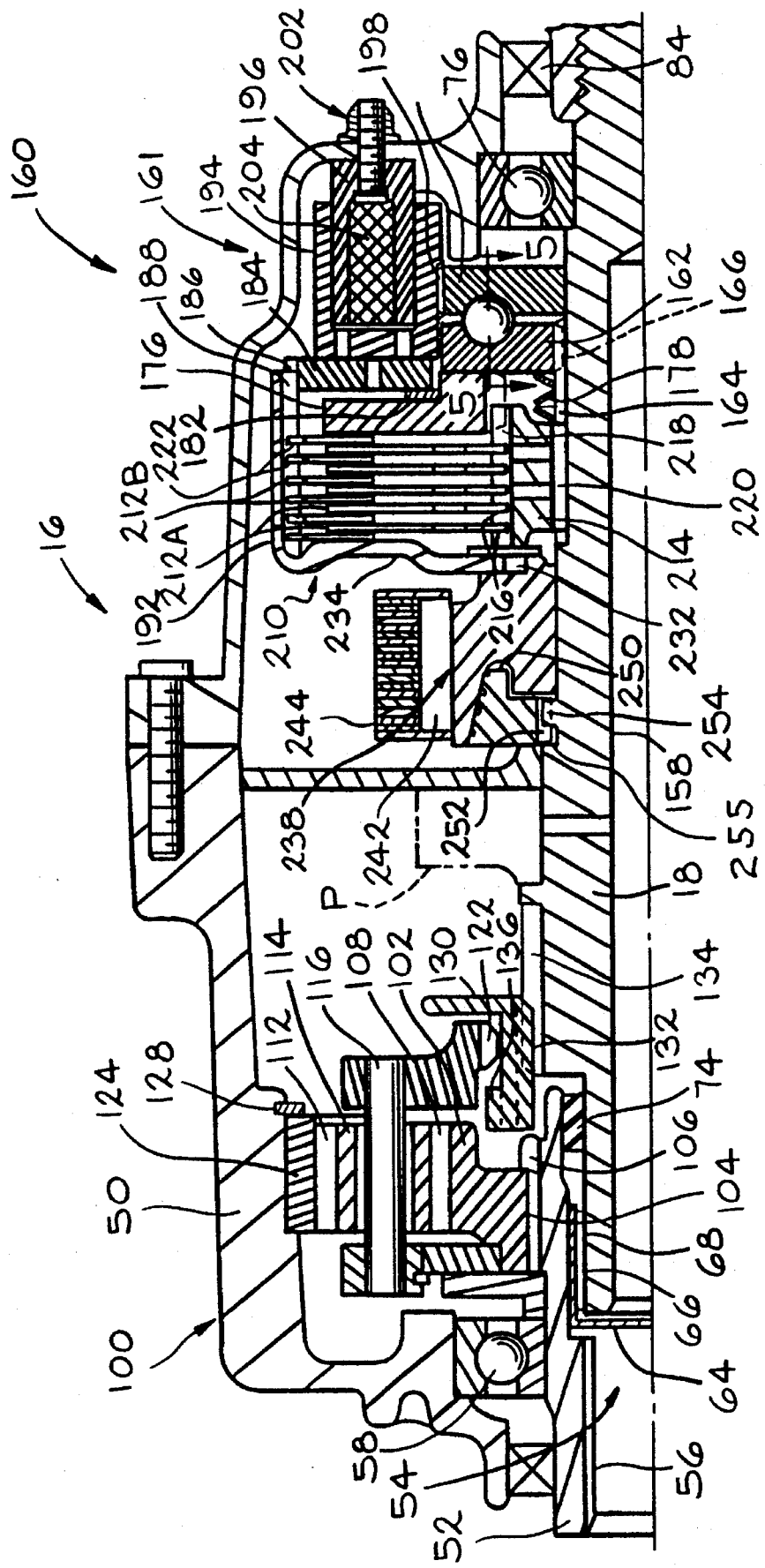

5,620,072

TRANSFER CASE HAVING DISC PACK AND CONE CLUTCH

BACKGROUND OF THE INVENTION

Virtually every full-time or part-time four-wheel drive consumer vehicle, i.e., passenger car, truck or sport utility vehicle utilizes a transfer case to direct a portion of the drive torque to a secondary driveline and drive wheels. Given the increased popularity of trucks and four-wheel drive vehicles, significant and increasing attention has been directed to the mechanical configuration of transfer cases.

One of the areas of development relates to the torque throughput of the transfer case and the myriad competing parameters which affect it. Torque throughput parameters involve issues such as size of the transfer case, size of the clutch, power consumption of the clutch, duty cycle of the clutch, power transfer demands of the vehicle, desired efficiency and many other physical and functional considerations.

One of the most obvious approaches to increasing the torque throughput capability of a transfer case clutch is the apparently simple expedient of increasing the size of the clutch. However, this expedient increases the size of the transfer case and its weight, two changes that are highly inimical to vehicle weight reduction and control programs. Secondly, a larger clutch will generally require greater electric or hydraulic power to effect its operation. This, too, is counterproductive to overall vehicle efficiency.

Accordingly, clutch configurations that do not involve either significant enlargement of components or increase the number of components in a transfer case are looked upon with great favor.

SUMMARY OF THE INVENTION

A transfer case includes a clutch assembly having both a disc pack clutch and cone clutch disposed in mechanical parallel between the primary transfer case output shaft and secondary output shaft. The disc pack clutch includes a plurality of interleaved discs and an electromagnetic operator which effects compression of the clutch pack to transfer torque from the primary transfer case shaft to an intermediate member such as a chain drive sprocket, thence to a chain, and finally to the secondary output shaft. The cone clutch is disposed adjacent the disc pack and is also actuated by the electromagnetic operator. One of the cone clutch members is driven by the main transfer case shaft and, preferably, the driven cone clutch member may be integrally formed with the chain drive sprocket which provides power to the drive chain and, in turn, to the secondary output shaft. The parallel torque paths provided by the two clutches greatly increase the torque throughput capability of the transfer case.

A planetary gear speed reduction assembly may also be located within the transfer case. A stub input shaft drives the planetary assembly and a clutch collar selectively couples the input shaft, the reduced speed output from the planetary carrier or neither (to provide neutral) to the primary transfer case output shaft.

It is thus an object of the present invention to provide a transfer case having both a disc pack and cone clutch disposed in mechanical parallel between the primary transfer case output shaft and secondary output shaft.

It is a further object of the present invention to provide a clutch assembly having increased torque handling capability in a transfer case for a four-wheel drive vehicle.

It is a still further object of the present invention to provide a transfer case having a cone clutch, one component of which is integrally formed with a chain drive sprocket.

It is a still further object of the present invention to provide a disc pack and cone clutch assembly which is capable of modulating torque distribution between the primary transfer case output shaft and associated primary driveline and secondary output shaft and associated secondary driveline.

It is a still further object of the present invention to provide a disc pack and cone clutch assembly controlled by a common operator.

it is a still further object of the present invention to provide a transfer case having a planetary gear speed reduction assembly having a direct (high gear) drive, reduced speed (low gear) drive and neutral.

Further objects and advantages of the present invention will become apparent by reference to the following description of the preferred embodiment and appended drawings.

BRIEF DESCRIPTION OF THE DRAWINGS

FIG. 3 is an enlarged, sectional view of a portion of a transfer case incorporating a clutch assembly according to the present invention;

Further details and features of the invention will become apparent upon reference to the following Description and appended drawings wherein like numerals refer to the same assembly, component or feature.

DESCRIPTION OF THE PREFERRED EMBODIMENT

Figure 1:
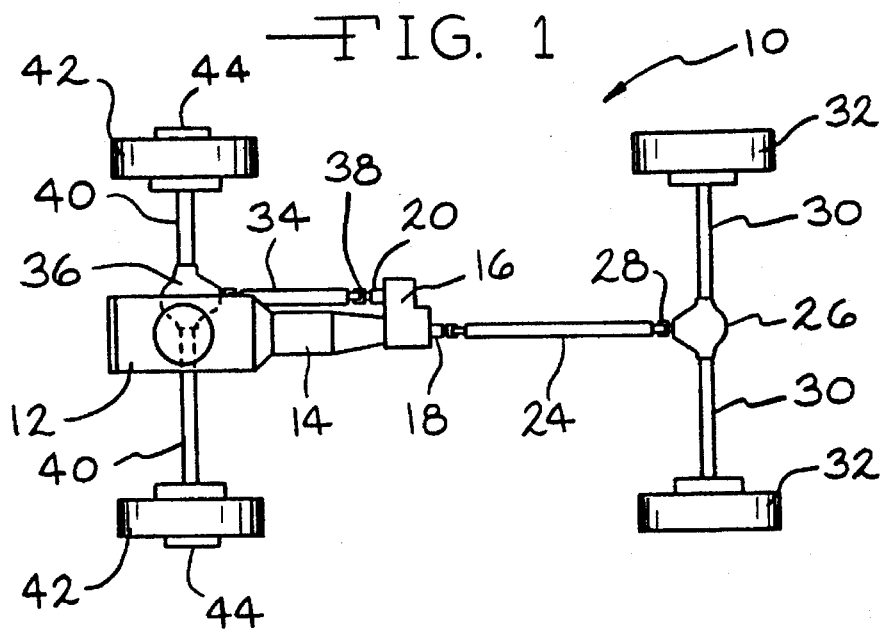
FIG. 1 is a diagrammatic view of a vehicle drive train incorporating a transfer case according to the present invention.
Figure 4:
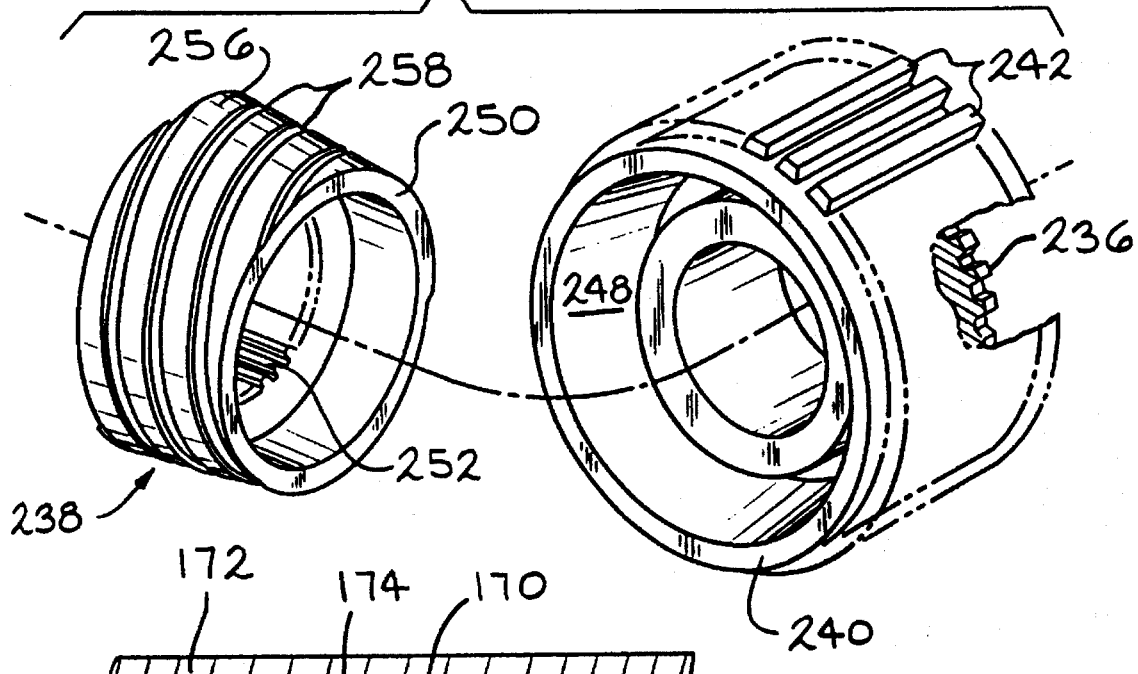
FIG. 4 is an exploded perspective view of the cone clutch portion of a clutch assembly according to the present invention.

Referring now to FIG. 1, a vehicle drive system incorporating the present invention is illustrated and generally designated by the reference numeral 10. The vehicle drive system 10 includes a prime mover such as an internal combustion engine 12 having an output which is operably coupled to a transmission 14. The transmission 14, in turn, has an output which is operably coupled to a transfer case assembly 16 according to the instant invention. The transfer case assembly 16 includes a main or primary, rear output shaft 18 and a secondary, front output shaft 20. The primary output shaft 18 of the transfer case 16 drives a rear drive shaft 24 which delivers power to a rear differential 26. Universal joints 28 are utilized as necessary and in accordance with conventional practice to couple the rear drive shaft 24 to the primary output shaft 18 and the rear differential 26. The output of the rear differential 26 is coupled through rear drive axles 30 to a pair of rear tire and wheel assemblies 32. In the rear wheel drive arrangement illustrated, the rear drive shaft 24, the rear differential 26, the universal joints 28, the rear drive axles 30 and the rear tire and wheel assemblies 32 constitute a primary (full-time) driveline.

Similarly, the front or secondary output shaft 20 of the transfer case assembly 16 drives a front drive shaft 34 which delivers power to a front differential 36. Again, appropriate universal joints 38 are utilized as necessary in accordance with conventional practice to couple the secondary output shaft 20 to the front drive shaft 34 and the front differential 36. The front differential 36 delivers power through a pair of front axles 40 to a pair of front tire and wheel assemblies 42. A respective pair of locking hubs 44 selectively couple the front axles 40 to a respective one of the tire and wheel assemblies 42. The locking hubs 44 may be either manually or automatically activated. If the locking hubs 44 are utilized with an automatic or semi-automatic system, they preferably include electric, pneumatic or hydraulic actuators (not illustrated) which may be remotely activated. In the rear wheel drive arrangement illustrated, the front drive shaft 34, the front differential 36, the universal joints 38, the front drive axles 40, the front tire and wheel assemblies 42 and the locking hubs 44 constitute a secondary (part-time) driveline.

While the primary rear wheel drive layout shown and described is considered to be a more typical application of the transfer case assembly 16 according to the present invention, it is anticipated and deemed to be well within the scope of the present invention for the transfer case assembly 16 to be utilized in a vehicle having its primary (full-time) drive wheels located at the front of the vehicle and the secondary (part-time) drive wheels located at the rear.

Figure 2:
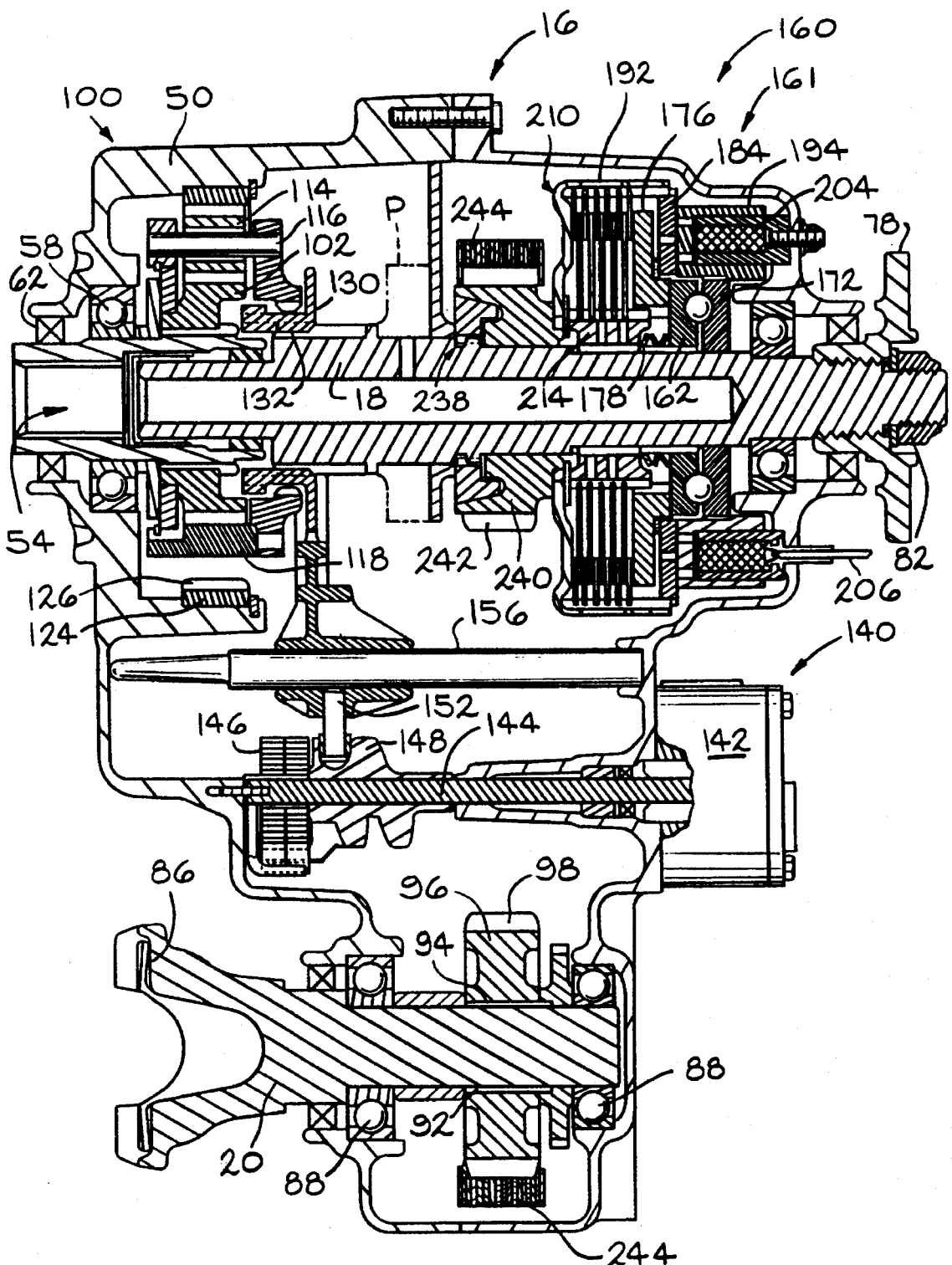
FIG. 2 is a full, sectional view of a transfer case incorporating a clutch assembly according to the present invention.

Referring now to FIGS. 2 and 3, the transfer case assembly 16 includes a multiple part, typically cast housing 50 having various openings for shafts and fasteners and various mounting surfaces and grooves for shaft seals, bearings, seal retaining grooves and other internal components as will be readily appreciated from inspection of FIGS. 2 and 3. The housing 50 receives a stub input shaft 52 defining a through, stepped bore 54 having a region of first diameter defining a plurality of female splines or gear teeth 56 or other suitable structures for engaging and drivingly receiving a complimentarily configured output shaft (not illustrated) of the transmission 14 illustrated in FIG. 1. The input shaft 52 is partially supported upon an anti-friction bearing such as the ball bearing assembly 58. A shaft seal 62 surrounds the input shaft 52 at the forward end of the housing 50. A larger diameter region of the stepped bore 54 of the input shaft 52 receives a cup shaped shaft seal 64 and a roller bearing 66. The roller bearing assembly 66, in turn, receives and rotatably supports a reduced diameter region 68 of a first or primary output shaft 18. Adjacent the interior end the input shaft 52 and disposed between the stepped bore 54 and the reduced diameter region 68 of the primary output shaft 18 is an elastomeric shaft seal 74. The opposite end of the primary output shaft 18 is rotatably supported in an anti-friction bearing such as a ball bearing assembly 76. The end of the primary output shaft 18 is preferably threaded and receives a complimentarily threaded flange 78 which may be conveniently secured to associated driveline elements illustrated in FIG. 1. A lock nut 82 or similar structure is preferably utilized to secure the flange 78 to the output shaft 18. A shaft seal 84 disposed between the flange 78 and the housing 50 provides an appropriate seal therebetween.

The housing 50 of the transfer case assembly 16 also receives a second or secondary output shaft 20 which may be integrally formed with or include a fitting or coupling 86 which forms a portion of a universal joint or similar driveline component. The secondary output shaft 20 is supported by a pair of anti-friction bearings such as the ball bearing assemblies 88. The secondary output shaft 20 includes a region of male splines 92. The male splines 92 receive and rotatably engage complimentarily configured female splines 94 disposed on the inner surface of a driven chain sprocket 96 having chain teeth 98.

The transfer case assembly 16 incorporates a planetary gear speed reduction assembly 100. The planetary gear speed reduction assembly 100 includes a centrally disposed sun gear 102 which is received upon and concentrically disposed about the input shaft 52. The sun gear 102 defines a plurality of female splines or gear teeth 104 which are complimentarily to and engage male splines or gear teeth 106 disposed about a portion of the periphery of the input shaft 52. The sun gear 102 is thus rotationally coupled to and driven by the input shaft 52. The sun gear 102 includes gear teeth 108 disposed about its periphery which drivingly engage complimentarily gear teeth 112 formed on a plurality of planet or pinion gears 114, one of which is illustrated in FIGS. 2 and 3. The pinion gears 114 are freely rotatably received upon a like plurality of stub shafts 116 which are mounted and retained within a carrier 118. The carrier 118 includes a plurality of internal gear teeth 122 disposed generally adjacent but axially offset from the male splines or gear teeth 106 on the exterior of the input shaft 52. A ring gear 124 having gear teeth 126 complimentary to the gear teeth 112 of the pinion gear 114 is fixedly secured within the housing 50 in operable alignment with the pinion gears 114 by a snap ring 128.

A sliding clutch collar 130 concentrically disposed about the primary output shaft 18 includes female splines or gear teeth 132 which are in constant mesh and driving engagement with complimentary male splines or gear teeth 134 disposed on the exterior of the primary output shaft 18. The female splines 132 are also complimentary to the male splines or gear teeth 106 disposed on the input shaft 52. A portion of the clutch collar 130 includes male splines or gear teeth 136 which are complimentary to and axially aligned with the female splines or gear teeth 122 of the carrier 118 of the planetary gear assembly 100 and which may be selectively engaged therewith.

Axial translation of the clutch collar 130 may thus be undertaken to selectively couple and directly drive the primary output shaft 18 from the input shaft 52 (high gear) when the clutch collar 130 is in a position to the left of that illustrated in FIGS. 2 and 3 such that the splines 106 and 132 are engaged. When the clutch collar 130 is in a position to the right of that illustrated in FIGS. 2 and 3 such that the splines or gear teeth 122 and 136 are engaged, the primary output shaft 18 is driven by the carrier 118 of the planetary gear speed reduction assembly 100 at a reduced speed (low gear) established by the gear ratio of the planetary gear assembly 100. When the clutch collar 130 is in the position illustrated in FIGS. 2 and 3, there is no driving connection between the input shaft 52 and the primary output shaft 18 and the transfer case assembly 16 is in neutral.

Selective axial translation of the clutch collar 130 and thus selection of either direct drive (high gear), reduced speed drive through the planetary gear assembly 100 (low gear) or neutral is achieved by an electromechanical actuator assembly 140. The electromechanical actuator assembly 140 includes an electric, pneumatic or hydraulic drive motor 142 which rotates a shaft 144. The shaft 144 drives an energy storing flat coil spring 146 which, in turn, drives a cam assembly 148. A cam follower pin 152 seats within a pathway in the cam assembly 148 and, as the shaft 144 and the cam 148 rotate, the pin 152 bi-directionally translates a shift fork 154 along a cylindrical bearing 156. As noted, the flat coil spring 146 provides a resilient, energy storing interconnection between the drive motor 142 and the shift fork 154 whereby the shift motor 142 may reach a desired position but the shift fork 154 and clutch collar 130 may not move into a corresponding desired position until forces acting upon the clutch collar 130 have lessened to a point where energy stored in the spring 146 will complete the shift commanded by the drive motor 142.

A gerotor pump P illustrated in phantom lines is disposed about the primary output shaft 18 and provides a pressurized flow of cooling lubricant to an axial bore 158 concentrically disposed within the primary output shaft 18. The bore 158 communicates with a plurality of radial ports (not illustrated) which provide the cooling lubricant to various components within the transfer case assembly 16 according to conventional practice.

Figure 5:
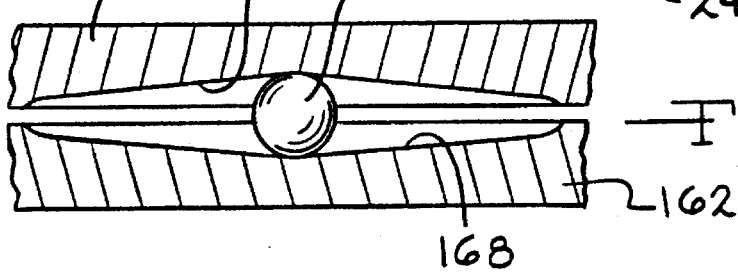
FIG. 5 is a flat pattern development of a clutch ball and associated recesses incorporated in a clutch assembly according to the present invention taken along line 5—5 of FIG. 3.

Referring now to FIGS. 2, 3 and 5 the transfer case assembly 16 also includes electromagnetically actuated disc pack and cone clutch assembly 160. The disc pack and cone clutch assembly 160 is disposed about the output shaft 18 and preferably includes a single operator or actuator assembly 161 having a circular drive member 162 coupled to the output shaft 18 through male splines or gear teeth 164 on the output shaft 18 and complimentary female splines 166 on the circular drive member 162. One face of the circular drive member 162 includes a plurality of circumferentially spaced apart recesses 168 in the shape of an oblique section of a helical torus, as illustrated in FIG. 5. Each of the plurality of recesses 168 receives one of a like plurality of load transferring balls 170.

A circular driven member 172 disposed adjacent the circular drive member 162 includes a like plurality of recesses 174 on an opposing face which define the same shape as the recesses 168. The oblique sidewalls of the recesses 168 and 174 function as ramps or cams and cooperate with the balls 170 to drive the circular members 162 and 172 axially apart in response to relative rotation therebetween. It will be appreciated that the recesses 108 and 174 and the load transferring balls 170 may be replaced with other analogous mechanical elements which cause axial displacement of the circular members 162 and 172 in response to relative rotation therebetween. For example, tapered rollers disposed in complimentarily configured conical helices may be utilized.

The circular drive member 162 is secured to or integrally formed with a radially outwardly extending apply plate 176. A compression spring 178 is concentrically disposed about the output shaft 18. The compression spring 178 may include a plurality of Belleville springs or wave washers. The compression spring 178 provides a biasing or restoring force to the circular drive member 162 and the apply plate 176 urging them to the right as illustrated in FIGS. 2 and 3. Behind, i.e., to the right of the apply plate 176 and generally aligned therewith is a circular flat washer 182. Adjacent the flat washer 182 is a clutch armature 184. The clutch armature 184 includes a plurality of male splines or gear teeth 186 disposed about its periphery which engage a complimentary plurality of female splines or gear teeth 188 which extend axially along the inner surface of a cylindrical portion of a bell shaped clutch housing 192.

Positioned adjacent the face of the armature 184 opposite the flat washer 182 and the apply plate 176 is a circular coil housing 194. The coil housing 194 is freely, rotatably received upon a complimentarily configured stationary mounting annulus 196. The coil housing 194 is coupled to and rotates with the circular driven member 172 by virtue of a splined interconnection 198 or other securement such as a friction fit. The mounting annulus 196 is secured to the housing 50 of the transfer case assembly 16 by a plurality of suitable fasteners 202, one of which is illustrated in FIGS. 2 and 3. The mounting annulus 196 receives an electromagnetic coil 204 which is connected to a source of electrical energy through a conductor 206.

Adjacent the apply plate 176 and contained within the clutch housing 192 is a disc pack assembly 210. The disc pack assembly 210 includes a plurality of interleaved friction plates or discs 212. A first plurality of smaller diameter discs 212(A) are received upon an intermediate collar 214 and rotatably driven thereby through female splines 216 and male splines 218. The intermediate collar 214 is in turn rotatably driven by the primary output shaft 18 through a splined interconnection 220. A second plurality of larger diameter discs 212(B) are interleaved with the first plurality of discs 212(A) and include splines 222 about their peripheries which engage the splines or gear teeth 188 on the inner surface of the cylindrical portion of the clutch housing 192 and rotate therewith.

The clutch housing 192 is concentrically disposed about the primary output shaft 18 and includes a plurality of female splines or gear teeth 232 about an aperture in the radially extending end wall 234 of the clutch housing 192.

Referring now to FIGS. 2, 3 and 5, a cone clutch assembly 238 is concentrically disposed about the primary output shaft 18 adjacent the end wall 234 of the clutch housing 192. The female splines 232 of the clutch housing 192 engage complimentarily configured male splines or gear teeth 236 adjacent an end face of a chain drive sprocket 240. The chain drive sprocket 240, which is also the driven member of the cone clutch assembly 238, is freely rotationally disposed about the primary output shaft 18 and includes chain drive teeth 242 about its periphery which engage a drive chain 244. The drive chain 244 transfers power to the driven sprocket 96 coupled to the secondary output shaft 20.

Referring now to FIG. 3 and especially FIG. 5, the chain drive sprocket 240 includes an interior frusto-conical surface 248 oriented at a small acute angle of between about 8° and 14° to the axis of the output shaft 18. An angle of 12.5° has been found to be preferable. Shallower angles provide good mechanical advantage but can present torque transfer control difficulties. Steeper angles provide good control but provide reduced mechanical advantage and thus require greater engagement force.

The cone clutch assembly 238 also includes a cone clutch drive member 250. The cone clutch drive member 250 includes a plurality of gear teeth or female splines 252 disposed in a concentric passageway which are received upon complimentarily configured gear teeth or male splines 254 formed in the primary output shaft 18 at an appropriate axial location. The male splines 254 extend over a limited axial distance and create a shoulder or stop 255 on the primary output shaft 18 against which the clutch drive member 250 abuts. The clutch drive member 250 includes an exterior frusto-conical surface 256 oriented at the same angle to the axis of the primary output shaft 18 as the interior frusto-conical surface 248 of the chain drive sprocket 240. The frusto-conical surfaces 248 and 256 function as clutch or friction surfaces and provide a torque path therebetween which is in mechanical parallel with the torque path through the disc pack assembly 210.

A plurality of lubrication grooves or channels 258 are formed on the exterior frusto-conical surface 256 of the clutch drive member 250. The channels 258 provide for the passage of lubricating fluid supplied by the gerotor pump P along and between the surfaces 248 and 256 of the cone clutch assembly 238. The channels 258 are preferably of a generally L-shaped configuration in cross-section wherein the short leg of the "L" is oriented radially and the long leg of the "L" is oriented parallel to the axis of the clutch drive member 250.

Operation of the transfer case assembly 16 will now be described. Typically, the position of the clutch collar 130 or the planetary gear assembly 100 will initially be adjusted to provide either high range (direct drive), neutral or low range (reduced speed drive) by appropriate operation of the drive motor 142. As noted above, this operational step comprehends engagement of either the splines 132 on the clutch collar 130 with the splines 106 on the input shaft 52 to provide direct drive, engagement of the splines 136 of the clutch collar 130 with the splines 122 on the carrier 118 to provide reduced speed drive or selection of a neutral position wherein neither of the foregoing spline engagements occur.

In conjunction with the foregoing gear selection, actuation of the electromagnetically actuated disc pack and cone clutch assembly 160 selectively transfers torque from the primary output shaft 18 and the associated primary driveline to the secondary output shaft 20 and the associated secondary driveline. Electrical energy is supplied to the electromagnetic coil 204 through a conductor 206 and may be adjusted either in analog magnitude or through duty cycle manipulation techniques such as pulse width modulation (PWM) or other modulation techniques to cause corresponding control of the magnitude of torque transfer between the primary output shaft 18 and the secondary output shaft 20.

As drag created on the circular coil housing 194 by the magnetic field generated by the electromagnetic coil 204 increases, relative rotation occurs between the circular drive member 162 and the circular driven member 172 such that the balls 170 separate the members 162 and 172 and the apply plate 176 begins to apply compressive force to the disc pack and cone clutch assembly 160. From the clutch force actuation standpoint, the disc pack assembly 210 and the cone clutch assembly 238 are in a stacked or series arrangement such that the compressive force generated by the balls 170 disposed between the circular members 162 and 172 is applied by the apply plate 176 to the disc pack assembly 210 and thence to the cone clutch assembly 238. Opposing (reaction) forces are transmitted in the opposite direction from the cone clutch assembly 238, through the disc pack assembly 210 and the apply plate 176 to the circular drive and driven members 162 and 172.

Torque transfer between the primary output shaft 18 and the secondary output shaft 20 through the disc pack assembly 210 and the cone clutch assembly 238, however, is achieved in parallel, that is, the disc pack assembly 210 and the cone clutch assembly 238 represent independent, though mechanically parallel, torque transfer paths between the primary output shaft 18 and the secondary output shaft 20.

By virtue of the parallel torque transfer paths through the two clutch assemblies 210 and 238, the torque capability of a conventional, prior art transfer case rated at approximately 350 pounds.feet may be increased through the use of the present invention to, for example, about 500 pounds.feet. This substantial torque throughput increase is achieved with no increase in the size of the transfer case assembly 16.

The foregoing disclosure is the best mode devised by the inventor for practicing this invention. It is apparent, however, that devices incorporating modifications and variations will be obvious to one skilled in the art of transfer case clutches. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A driveline clutch assembly comprising, in combination, a first output shaft for providing power to a first driveline, a second output shaft for providing power to a second driveline, a disc pack clutch operably disposed between said first output shaft and said second output shaft, a cone clutch operably disposed between said first output shaft and said second output shaft, said cone clutch including a first member driven by said first output shaft and a second member driving said second output shaft, and an actuator for engaging said disc pack clutch and said cone clutch and controlling power transfer from said primary output shaft to said secondary output member whereby power transferred from said first output shaft to said second output shaft is the sum of power transferred through said disc pack clutch and said cone clutch.

2. The driveline clutch assembly of claim 1 wherein said second member is a chain drive sprocket.

3. The driveline clutch assembly of claim 1 further including a frusto-conical clutch interface disposed between said first member and said second member.

4. The driveline clutch assembly of claim 1 wherein said disc pack clutch includes a first plurality of clutch plates disposed for rotation with said first output shaft and a second plurality of clutch plates interleaved with said first plurality of clutch plates disposed for rotation with said second member.

5. The driveline clutch assembly of claim 1 wherein one of said cone clutch members includes a frusto-conical surface having at least one helical channel formed therein.

6. The driveline clutch assembly of claim 1 wherein said actuator is an electromagnetic coil and said actuator provides compressive force to said disc pack and said cone clutches.

7. A clutch assembly comprising, in combination, an input member, an output member, a disc pack clutch operably disposed between said input member and said output member, a cone clutch operably disposed between said input member and said output member, and a single actuator acting upon both said disc pack clutch and said cone clutch for controlling power transfer from said input member to said output member whereby power transferred from said input shaft to said output shaft is the sum of power transferred through said disc pack clutch and said cone clutch.

8. The clutch assembly of claim 7 wherein said output member is a chain drive sprocket.

9. The clutch assembly of claim 7 wherein said disc pack clutch includes a first plurality of disc plates driven by said input member and a second plurality of clutch discs interleaved with said first plurality of clutch discs and driving said output member.

10. The clutch assembly of claim 7 wherein said cone clutch includes a first clutch member driven by said input member and having a frusto-conical first clutch surface and said output member has a frusto-conical second clutch surface disposed in operable relationship with said first frusto-conical clutch surface.

11. The clutch assembly of claim 10 wherein said clutch members define an axis and said first and second clutch surfaces are oriented at a small acute angle to said axis.

12. The clutch assembly of claim 11 wherein said small acute angle is between about 8° and 14°.

13. The clutch assembly of claim 7 wherein said single operator includes a force generator for compressing said disc pack clutch and said cone clutch.

14. The clutch assembly of claim 7 wherein said single operator includes an electromagnetic coil and two adjacent circular members defining a plurality of pairs of opposed camming recesses, each of said pair of recesses receiving a ball.

15. A transfer case assembly for a vehicle comprising, in combination, a first output shaft for driving a first driveline, a second output shaft for driving a second driveline, a disc pack clutch and a cone clutch operably disposed in mechanical parallel between said first output shaft and said second output shaft, and an actuator for controlling torque transfer through said clutches from said first output shaft to said second output shaft.

16. The transfer case assembly of claim 15 wherein said actuator is an electromagnetic coil and said actuator provides compressive force to said disc pack and said cone clutches.

17. The transfer case assembly of claim 15 wherein said disc pack clutch includes a first plurality of clutch discs rotating with said first output member and a second plurality of clutch discs interleaved with said first plurality of clutch discs operably coupled to said second output member.

18. The transfer case assembly of claim 15 wherein said cone clutch includes a first member driven by said first output shaft and a second member operably coupled to said second output shaft.

19. The transfer case assembly of claim 18 wherein said second member of said cone clutch is a chain drive sprocket disposed about said first output shaft.

20. The transfer case assembly of claim 15 further including an input shaft, a planetary gear assembly having a reduced speed output and a clutch collar drivingly engaging said first output shaft and selectively engageable with said input shaft or said reduced speed output.

* * * * *